Jan. 30, 1968  A. A. SNAPER  3,366,736
LENS MAGNIFIER APPARATUS
Filed Sept. 21, 1964
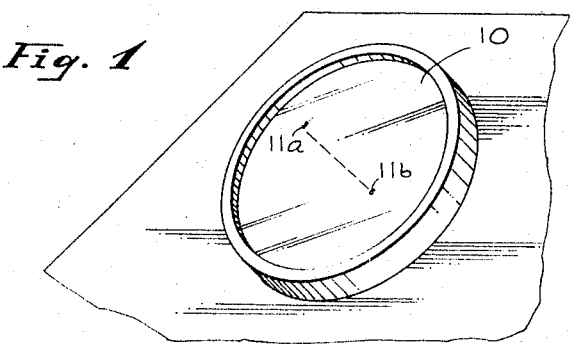
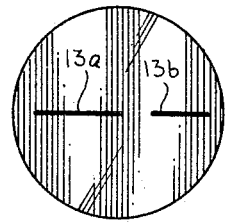
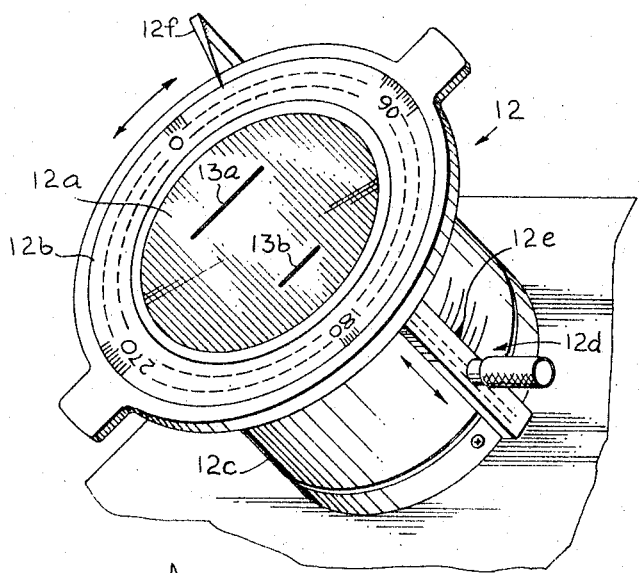
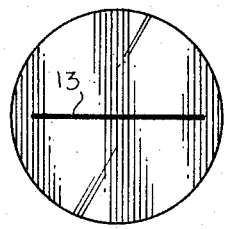
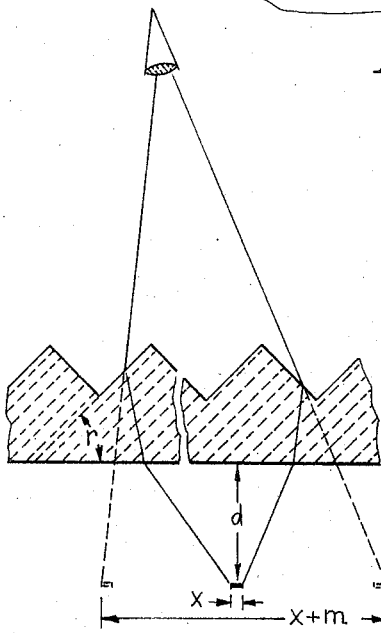
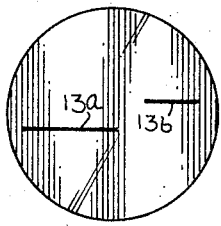
INVENTOR
ALVIN A. SNAPER
BY Allen E. Botney
ATTORNEY

United States Patent Office 3,366,736
Patented Jan. 30, 1968

3,366,736
LENS MAGNIFIER APPARATUS
Alvin A. Snaper, P.O. Box 83, Burbank, Calif. 91503
Filed Sept. 21, 1964, Ser. No. 397,890
4 Claims. (Cl. 178—7.85)

ABSTRACT OF THE DISCLOSURE

This invention involves mounting a particular kind of lens in such a manner that it can be used to indicate relative motion between dots on a radar screen that, in turn, represents objects in space. The lens is flat on one side and contains parallel ridging on the other side. The mounting must be such that the lens can either be rotated about its axis or moved linearly toward or away from the radar screen.

---

The present invention relates in general to the radar field and more particularly relates to a lens magnifier apparatus for use in connection with radar systems.

As is well known, when a radar beam intercepts an object in space, such an airplane or missile, a "blip" or point of light representing the detected object is presented on the radar screen with the position of the point of light on the radar screen corresponding to the position of the object in space. As is equally well known, if two or more objects are detected during the radar scan, then two or more points of light will likewise appear on the radar screen. In the latter case, it is oftentimes desirable and, indeed, sometimes absolutely essential to determine whether or not there is or has been any relative motion between any two of the objects or, stated differently, whether or not a pair of blips on the screen are moving or have moved toward or away from each other and, qualitatively speaking, in what manner they have changed their positions relative to each other. In this regard, it would be particularly desirable to be able to leave the radar screen unattended for a period of time and to be able to make this determination instantaneously upon returning to it. This cannot be done very readily at the present time.

It is, therefore, an object of the present invention to provide lens magnifier apparatus that will facilitate and expedite the tracking of two or more objects.

It is another object of the present invention to provide lens magnifier apparatus that will make it possible to more readily determine or ascertain whether two objects are moving or have moved relative to each other.

The novel features which are believed to be characteristic of the invention, both as to its organization and method of operation, together with further objects and advantages thereof, will be better understood from the following description considered in connection with the accompanying drawing in which an embodiment of the invention is illustrated by way of example. It is to be expressly understood, however, that the drawing is for the purpose of illustration and description only and it is not intended as a definition of the limits of the invention.

FIGURE 1 illustrates a radar screen and a couple of blips thereon respectively representing a pair of objects in space;

FIGURE 2 illustrates the same radar screen with lens magnifier apparatus according to the present invention mounted over it;

FIGURE 3 is a front view of the face of a lens magnifier apparatus following its rotation through a certain required angle;

FIGURE 4 is a front view of the face of the same lens magnifier apparatus after it has been moved toward or away from the radar screen a certain required distance;

FIGURE 5 is a front view of the face of the same lens magnifier apparatus and illustrates what happens as a result of the relative motion of the objects; and FIGURE 6 is a diagram that depicts the lens in cross-section and includes a diagram for illustrating the principles thereof.

Considering now the drawing, reference is made to FIG. 1 wherein a radar screen 10 is shown upon which a couple of "blips" or spots of light 11a and 11b are presented that respectively correspond to a pair of objects in space intercepted by the radar beam. It is normally quite difficult to determine at a glance whether the objects that these points of light represent are moving relative to each other and the nature of such motion, and it is just such a result that a lens magnifier apparatus according to the present invention is intended to achieve.

Such a lens magnifier apparatus is shown in FIG. 2 to which reference is now made. The lens magnifier apparatus is generally designated 12 and, as may be seen from the figure and as may be expected, it is mounted over the radar screen. The lens itself is designated 12a and it is mounted within and supported by an annular-shaped frame 12b which has a scale imprinted along its annular surface, as is shown in the figure. The scale is preferably in terms of angular degrees and divisions thereof but other appropriate scales may be used as well. The frame 12b is rotatably mounted on one end of a cylindrical member 12c, the other end of this cylindrical member being mounted over and enclosing the radar screen. As may be expected, member 12c is a hollow cylinder so that light from the radar screen may reach lens 12a. Although it will be discussed in greater detail below, it should nevertheless be mentioned here that lens 12a has a granular-type structure to it with the grains all being parallel to each other.

In addition to being rotatable on member 12c, the frame 12b is also mounted so as to be movable or slidable in the direction of the cylinder axes, that is to say, toward and away from the radar screen. Thus, lens 12a is both rotatable about and slidable along cylindrical member 12c. To facilitate the movement of lens 12a toward and away from the radar screen, a micrometer arrangement 12d is mounted along the side of member 12c and coupled to frame 12b, the lens being moved closer to the screen when the micrometer handle is turned in one direction and moved away from the screen when the handle is turned in the other direction. A linear scale is imprinted alongside micrometer arrangement 12d as is shown in the figure, and a pointer 12e is employed to indicate displacement of the lens from a normal or quiescent position. Similarly, a pointer 12f is provided for the scale on frame 12b, the pointer 12f indicating the number of degrees through which the lens has been rotated from its zero degree position.

Finally, it should be noted that a pair of lines are visually presented on the face of lens 12a and that these lines which are designated 13a and 13b, respectively correspond to the blips or points of light 11a and 11b on the radar screen. For reasons that will be explained in greater detail below, these points of light, when projected onto lens 12a, appear as lines which extend in a direction that is perpendicular to the "grain" of the lens. Stated differently, it is a phenomenon of the present invention that points of light on the radar screen appear as thin bars or lines of light on the face of the lens and that this is true irrespective of the position or angular displacement of the lens.

As was previously mentioned, these lines of light extend in a direction that is at all times perpendicular to the grain of the lens, with the result, therefore, that the orientation of these lines changes as the lens is rotated in order that the condition that they at all times remain perpendicular to the grain of the lens be fulfilled. Hence, it will be recognized by anyone skilled in the art, that if lens 12a is rotated so that its grain is perpendicular to the line joining the two points of light 11a and 11b in FIG. 1, the corresponding bars or lines of light 13a and 13b in FIG. 2 will lie in the same line as segments thereof, as is clearly illustrated in FIG. 3. More specifically, since the grain of lens 12a is perpendicular to the line common to points 11a and 11b and, furthermore, since lines 13a and 13b are perpendicular to the grain of the lens, then it necessarily follows that under these conditions lines 13a and 13b be parallel to or lie in the same line. With respect to lines 13a and 13b, it should be mentioned that they are shown to be spaced or separate from each other in FIG. 3. However, lines 13a and 13b may also be long enough to overlap so as to appear as a single line segment in FIG. 3, and whether or not these lines will be spaced apart or overlap depends upon the distance between lens 12a and radar screen 10 which, it will be remembered, is adjustable. In other words, lines 13a and 13b can be shortened by moving lens 12a closer to radar screen 10 or, on the other hand, these lines can be lengthened by moving the lens further away from the radar screen.

Since lines 13a and 13b in FIG. 3 are spaced from each other, the next step to be followed in the use of the subject apparatus is to increase the distance or spacing between lens 12a and radar screen 10, that is to say, to move the lens further away from the radar screen. For this purpose, micrometer arrangement 12d is used, the micrometer handle being turned in the appropriate direction until lines 13a and 13b just barely touch and become one, as is indicated by line 13 in FIG. 4. In other words, by lengthening lines 13a and 13b, the spacing therebetween is reduced and this process of lengthening the lines is continued until the spacing between them is reduced to zero, that is to say, it is continued until the lines barely touch or merge to become a single line. If now, any change should occur in the relative positions of the two points of light on the radar screen, a corresponding change will occur in the line structure shown in FIG. 4.

Generally speaking, if any such change in the relative positions of blips 11a and 11b should occur, then this will result in the breakup of single line segment 13 in FIG. 4 into its component line segments 13a and 13b. Such a breakup may involve only a separation of the line segments 13a and 13b of the kind shown in FIG. 5, but it may additionally involve an angular reorientation of these line segments. It all depends on the nature of the relative motion between the dots of light on the radar screen and, therefore, on the nature of the relative motion between the objects in space that the dots of light represent. However, the point that is to be emphasized here is that once the lens magnifier apparatus of the present invention has been adjusted to produce or establish the conditions illustrated by FIG. 4, then it becomes a rather easy matter to determine whether the objects in space have changed their positions with respect to each other simply by observing whether the single line segment 13 of FIG. 4 still remains as such or whether it has been broken up into its two component parts, namely, line segments 13a and 13b. It should also be emphasized that by bringing the lines together again, a fairly accurate determination can be made of the positional changes that took place. More specifically, if lens 12a is once again rotated in one direction or another and/or moved toward or away from the radar screen until the two line segments are once again merged into one and if these further angular and/or linear displacements are noted, as can be done with the aid of the aforesaid scales and pointers, then the nature of the motion of the objects in space can be determined with reasonable accuracy.

It is thus seen that the above-described lens magnifier apparatus operates in accordance with the basic purposes of the invention, which is to facilitate and expedite a determination of whether two objects are moving or have moved relative to each other and, also, the nature of that motion.

For an understanding of the principles underlying the present invention, reference is now made to FIG. 6 wherein a portion of a lens magnifier of the kind herein involved is shown in a cross-sectional type view. As shown, while one side or surface of the lens is flat, the other side is a sawtooth or ridged surface and it is this sawtooth or ridged surface of the lens that was previously referred to as its grain. The magnification of the lens is determined by Snell's law for refraction at the top and bottom surfaces of the magnifying plate where the magnification, $m$, is given approximately by the equation:

$$m = 2d(\eta - 1) \tan \gamma \qquad (1)$$

As shown in the figure, $m$ is the apparent increase in dimension of the object in the direction of magnification as determined by the orientation of the magnifying plate, $d$ is the distance from the plate to the object, $\eta$ is the index of refraction of the lens material, and $\gamma$ is the angle formed by extending a facet of the top surface of the magnifying plate so that it intersects the bottom surface of the plate.

The image dimension in the direction of magnification is approximately $x+m$, where $x$ is the corresponding object dimension. Magnification increases linearly with distance from plate to object, is independent of the size $x$ of the object, and for practical purposes is independent of the location of an observer's eyes, thereby permitting binocular observation and freedom of movement of an observer or observers.

The magnification is independent of the linear dimensions of the plate; it is related only to the angle $\gamma$ and the index of refraction of the material of which the magnifying plate is made. However, the limit of resolution in the direction of magnification is equal to the distance between ridges on the plate.

Although a particular arrangement of the invention has been illustrated and described above by way of example, it is not intended that the invention be limited thereto. Nor is it intended that the invention be limited in its use only to radar systems, since it can be applied wherever objects are being tracked. Thus, for example, the present invention can be used in connection with sonar systems as well as in astronomy for star-tracking purposes. Accordingly, the invention should be considered to include any and all modifications, alterations or equivalent arrangements falling within the scope of the annexed claims.

Having thus described the invention, what is claimed is:

1. Lens magnifier apparatus comprising: a hollow cylindrical member; a lens plate mounted over one end of said member, said lens plate being flat on one side thereof and having parallel, equal-sided, and equal-angled ridges on the other side thereof the flat side of said lens plate facing toward the other end of said member; first means for rotating said lens plate about the axis of said cylindrical member; and second means independent from said first means for slidably moving said lens plate in a direction that is along the axis of said cylindrical member, said first and second means being adapted to provide said rotational and slidable movements independently of one another.

2. The combination comprising: means for presenting on a cathode-ray tube screen a pair of points of light that respectively represent a pair of objects being tracked; and lens magnifier apparatus for facilitating and expediting the determination whether relative motion exists between said objects, said apparatus including a hollow cylindrical member mounted at one end over and enclosing said screen, a lens plate mounted over and covering the other end of said member, said lens plate being flat on one side thereof and having parallel, equal-sided and equal-angled ridges on the other side thereof, the flat side of the lens plate being the closer side to the screen, first and second means for angularly and linearly displacing said lens plate around and along the axis of said cylindrical member, respectively, said first and second means being adapted to provide said angular and linear displacements independently of one another.

3. The combination comprising: means for presenting on a cathode-ray tube screen a pair of points of light that respectively represent a pair of objects being tracked; and apparatus for facilitating and expediting the determination whether relative motion exists between said objects, said apparatus including a hollow cylindrical member mounted at one end over and enclosing said screen, an annular-shaped element rotatably and slidably mounted on the other end of said member, and a lens centrally mounted in and held by said annular-shaped element to cover said other end of the cylindrical member, said lens being flat on one side thereof and having a sawtooth surface configuration on the other side thereof, the flat side of the lens being the closer side to the screen.

4. The combination defined in claim 3 wherein said apparatus further includes a mechanism mounted on the side of said cylindrical member and coupled to said annular-shaped element for selectively moving the latter toward and away from the screen.

References Cited

UNITED STATES PATENTS

| | | | |
|---|---|---|---|
| 2,055,696 | 9/1936 | Marshall | 350—188 |
| 2,580,240 | 12/1951 | Newman | 178—7.83 |
| 2,818,765 | 1/1958 | Foster | 350—162 |
| 2,909,770 | 10/1959 | Pugsley | 178—7.85 |
| 3,095,475 | 6/1963 | Brake | 178—7.85 |

FOREIGN PATENTS

| | | |
|---|---|---|
| 214,252 | 7/1956 | Australia. |
| 1,263,557 | 5/1961 | France. |

ROBERT L. GRIFFIN, *Primary Examiner.*

JOHN W. CALDWELL, *Examiner.*

J. A. ORSINO, *Assistant Examiner.*